(12) United States Patent
Mudd

(10) Patent No.: US 8,290,332 B2
(45) Date of Patent: Oct. 16, 2012

(54) OPTICAL FIBER ADAPTER

(75) Inventor: Ronald Mudd, Richardson, TX (US)

(73) Assignee: CommScope, Inc. of North Carolina, Hickory, NC (US)

(*) Notice: Subject to any disclaimer, the term of this patent is extended or adjusted under 35 U.S.C. 154(b) by 108 days.

(21) Appl. No.: 12/849,858

(22) Filed: Aug. 4, 2010

(65) Prior Publication Data

US 2011/0038592 A1   Feb. 17, 2011

Related U.S. Application Data

(60) Provisional application No. 61/233,587, filed on Aug. 13, 2009.

(51) Int. Cl.
*G02B 6/00* (2006.01)

(52) U.S. Cl. .......................... 385/136; 385/60

(58) Field of Classification Search ............. 385/136, 385/60
See application file for complete search history.

(56) References Cited

U.S. PATENT DOCUMENTS

| | | | |
|---|---|---|---|
| 3,453,005 A * | 7/1969 | Foults | 285/82 |
| 3,584,902 A * | 6/1971 | Vyse | 285/305 |
| 4,279,468 A * | 7/1981 | Turley et al. | 385/59 |
| 4,687,084 A * | 8/1987 | Leigh-Monstevens et al. | 192/85.52 |
| 4,723,257 A * | 2/1988 | Baer et al. | 372/108 |
| 4,812,009 A | 3/1989 | Carlisle | |
| 4,834,486 A | 5/1989 | Walker | |
| 5,142,597 A | 8/1992 | Mulholland | |
| 5,151,961 A * | 9/1992 | Hvezda et al. | 385/60 |
| 5,177,803 A * | 1/1993 | Newhouse et al. | 385/43 |
| 5,181,267 A | 1/1993 | Gerace | |
| 5,396,572 A | 3/1995 | Bradley | |
| 5,509,750 A * | 4/1996 | Boike | 403/164 |
| 6,471,418 B1 * | 10/2002 | Yamaguchi | 385/78 |
| 6,652,155 B2 | 11/2003 | Lampert | |
| 7,591,682 B2 * | 9/2009 | Umemura et al. | 439/638 |
| 2003/0152339 A1 * | 8/2003 | Dair et al. | 385/92 |
| 2003/0174972 A1 | 9/2003 | Cheng | |
| 2005/0232550 A1 | 10/2005 | Nakajima | |
| 2006/0159399 A1 * | 7/2006 | Erdman et al. | 385/53 |
| 2007/0059972 A1 * | 3/2007 | Rigollet et al. | 439/441 |
| 2008/0299832 A1 * | 12/2008 | Umemura et al. | 439/638 |

* cited by examiner

*Primary Examiner* — Charlie Peng
*Assistant Examiner* — Peter Radkowski
(74) *Attorney, Agent, or Firm* — Muncy, Geissler, Olds & Lowe, PLLC

(57) ABSTRACT

A fiber optic adapter releasably retains at least one optical fiber connector and includes a body portion having a first side, a second side, and a through-opening between the first side and the second side, a first housing projecting from the body portion first side, the first housing including a bore for receiving the at least one optical fiber connector and having at least one sidewall and an end wall, the housing overlying the through-opening, and a retainer mountable on the first housing and including first and second flexible arms for engaging opposite sides of the first housing to attach the retainer to the first housing, the retainer including at least one projection configured to block the removal of the at least one optical fiber connector from the bore when the flexible arms engage the opposite sides of the first housing.

20 Claims, 8 Drawing Sheets

OPTICAL FIBER ADAPTER

CROSS-REFERENCE TO RELATED APPLICATIONS

The present invention claims the benefit of U.S. Provisional Patent Application No. 61/233,587, filed Aug. 13, 2009, the entire contents of which are hereby incorporated by reference.

FIELD OF THE INVENTION

The present invention is directed to an adapter for securing an optical fiber connector to a body supporting the adapter, and, more specifically, toward an adapter comprising a housing having at least one bore for receiving an optical fiber connector and a retainer for selectively securing the connector to the housing.

BACKGROUND OF THE INVENTION

A fiber optic fan-out module is a product used in networks to split optical signals out from a high density cable into individual cables. It is generally desirable to make the module as small as possible so that a high density can be achieved in a patch panel. One hindrance to making smaller modules has been the size of the fiber optic connector used to secure cables to a housing. Conventionally, the same connectors are used inside the module as outside of the module. These connectors include, among other elements, a ferrule, a spring push, a spring and a connector body holding the ferrule, spring and spring push. If the structure of the connectors could be simplified, the size of the connectors could be reduced and this would allow for a higher density of connectors and in some cases the use of a smaller module. It would therefore be desirable to provide an adapter for connecting such a simplified connector to a module.

SUMMARY OF THE INVENTION

This problem and others are addressed by embodiments of the present invention, a first aspect of which comprises a fiber optic adapter configured to releasably retain at least one optical fiber connector. The adapter includes a body portion having a first side, a second side, and a through-opening between the first side and the second side. A first housing projects from the body portion first side around the through opening, and the first housing includes a bore for receiving the at least one optical fiber connector and has at least one sidewall and an end wall. The adapter also includes a retainer mountable on the first housing that has first and second flexible arms for engaging opposite sides of the first housing to attach the retainer to the first housing, and the retainer includes at least one projection configured to block the removal of the at least one optical fiber connector from the bore when the flexible arms engage opposite sides of the first housing.

Another aspect of the invention comprises a fiber optic adapter configured to releasably retain at least one optical fiber connector which adapter includes a body portion having a first side, a second side, and a through-opening between the first side and the second side, and a housing arrangement projecting from the body portion first side for receiving the at least one optical fiber connector. The housing arrangement has at least one sidewall and an end wall and overlies the through-opening. The adapter also includes a retainer device for engaging opposite sides of the housing arrangement to attach the retainer device to the housing arrangement. The retainer device includes a projecting arrangement for blocking the removal of the at least one optical fiber connector from the housing arrangement when the retainer device engages the opposite sides of the housing arrangement.

A further aspect of the invention comprises a fiber optic adapter configured to releasably retain at least one optical fiber connector, the adapter including a body portion having a first side, a second side, and a first through-opening between the first side and the second side and a first housing projecting from the body portion first side around the first through-opening with a bore in communication with the first through-opening. The housing has at least one sidewall and first and second slots extending into the at least one sidewall and into the bore, and the bore has a centerline and a cross-section perpendicular to the centerline between the first and second slots. A first retainer is mounted on the first cylindrical housing and includes a first pair of flexible arms configured to engage opposite sides of the first housing to attach the first retainer to the first housing. Each arm of the first pair of flexible arms including a tab extending through the first and second slots of the first housing and into the bore, the tabs of the first pair of flexible arms reducing an area of the cross-section.

BRIEF DESCRIPTION OF THE DRAWINGS

These and other features and aspects of the invention will be better understood after a reading of the following detailed description of embodiments of the invention together with the attached drawings wherein.

DETAILED DESCRIPTION

Figure 1:
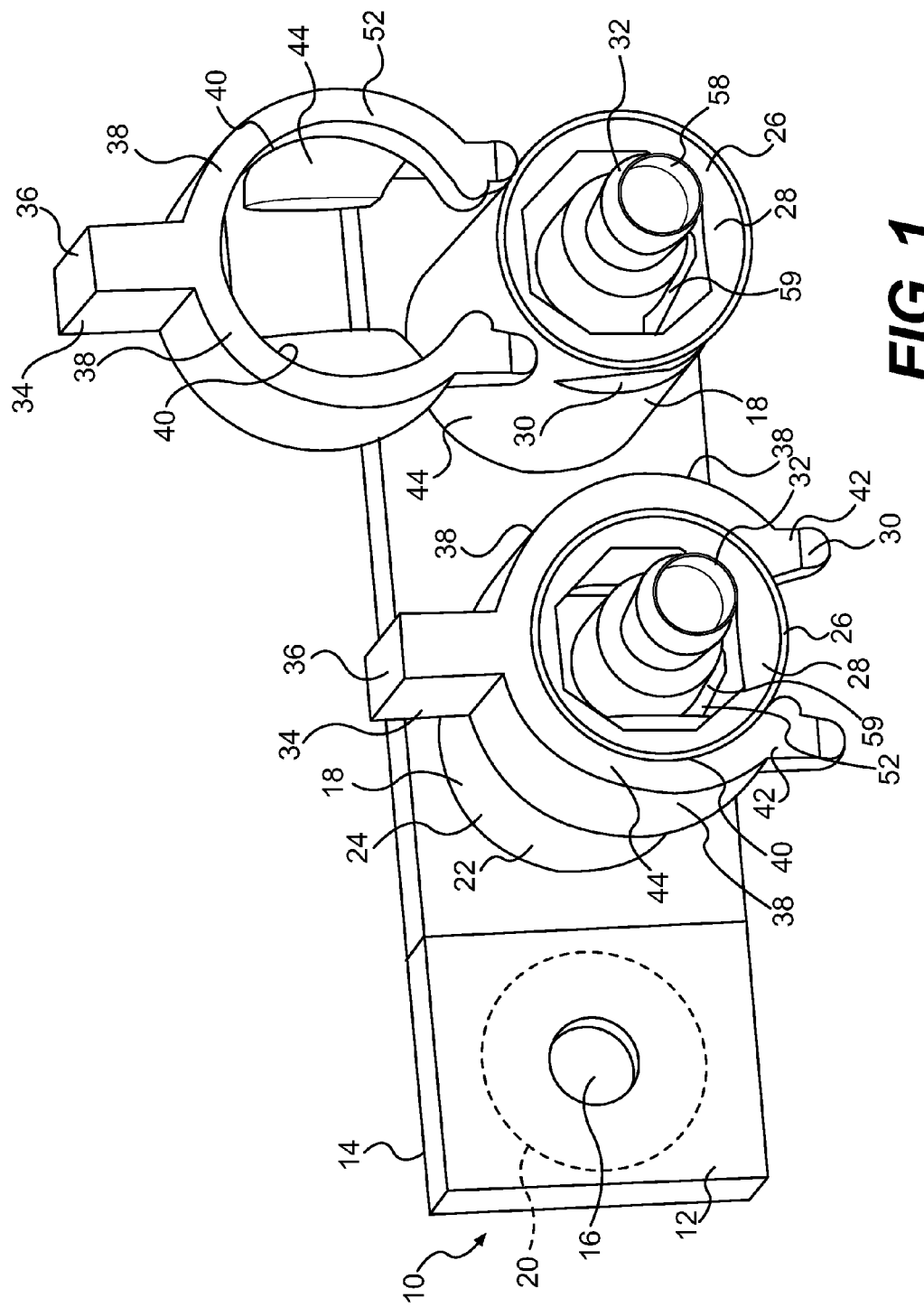
FIG. 1 is perspective view of an optical fiber adapter according to a first embodiment of the present invention that includes first and second retainers securing first and second optical fiber connectors in an adapter body housing.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

FIG. 1 illustrates an adapter body 10 having a first side 12, a second side 14, and a plurality of through-openings 16 (only one of which is illustrated) between the first side 12 and second side 14. Each through-opening 16 is surrounded by a generally cylindrical housing 18, two of which are illustrated in FIG. 1. Dashed line 20 in FIG. 1 shows where a third cylindrical housing 18 has been removed to show the through-opening 16 therebehind. The cylindrical housings 18 may be attached to the adapter body 10 in any conventional manner or may be molded or otherwise formed with the adapter body 10 as a unitary portion thereof. Cylindrical housings 18 each include a sidewall 22 having a curved outer surface 24 and an end wall 26 spaced from the adapter body 10. A bore 28 extends from end wall 26 into the cylindrical housing 18 to one of the through-openings 16, and bore 28 is generally larger than and aligned with the one of the through-opening 16 and configured to receive a connector, such as connector 32 illustrated in FIG. 2. The cylindrical housings 18 also include first and second opposed slots 30 that extend through sidewall 22 from outer surface 24 into bore 28 which first and second slots 30 are located on the left and right sides of the cylindrical housing 18 as viewed in FIG. 1.

A retainer 34 snaps onto each of the cylindrical housings 18 to secure a connector 32 in the housing 18 as described hereafter. Each of the retainers 34 includes a body portion 36 that can be gripped by a user to manipulate the retainer 34 and first and second flexible, arcuate, arms 38 that extend from body portion 36 and have concave portions 40 facing one another. The arms 38 that terminate in free ends 42 spaced apart from one another by a distance less than a width of cylindrical housing 18. The distance between the first and second arms 38 along the concave portions 40 thereof is slightly less than the width of housing 18 so that the arms 38 grip housing 18 when the retainer 34 is installed on the housing 18. Each arm also includes a tab 44 on concave portion 40 that projects toward the other one of the first and second arms 38, which tabs 44 project through the slots 30 in housing sidewall 22 and into bore 28 when the retainers 34 are mounted on the housings 18.

Figure 2:
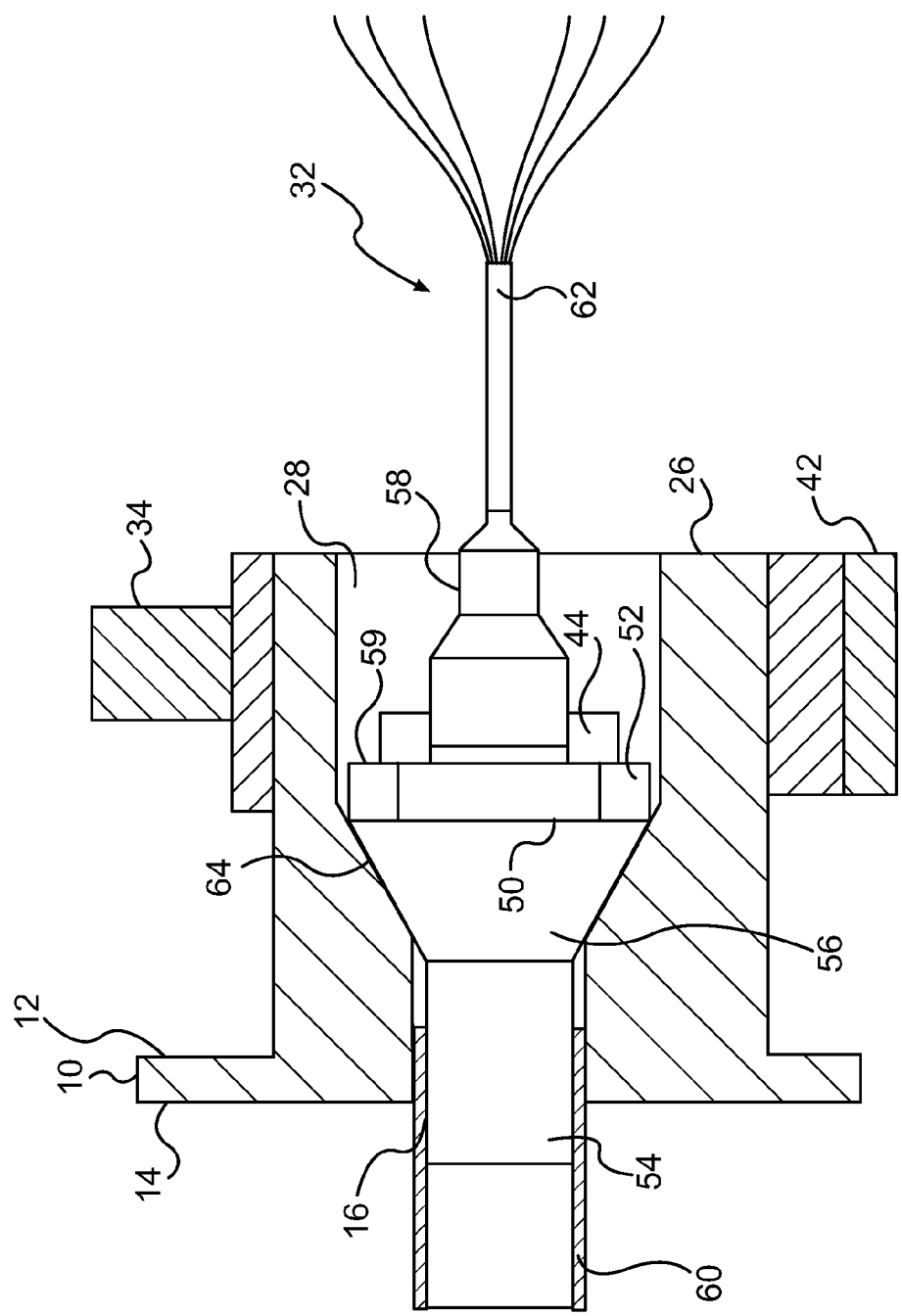
FIG. 2 is a side elevational view, partly in section, of a connector secured in one of the housings of FIG. 1 by one of the retainers of FIG. 1.

A connector 32 configured to be received and retained in cylindrical housing 18 is illustrated in FIG. 2. Connector 32 includes a ferrule barrel 50 with a hexagonal body portion 52, a ferrule 54, a tapered portion 56 between the hexagonal body portion 52 and the ferrule 54. Connector 32 also includes a strain relief section 58 on the side of hexagonal body portion 52 opposite from ferrule 54, and a wall 59 between hexagonal body portion 52 and strain relief section 58. A sleeve 60 aligns ferrule 54 with an opposing mated ferrule (not illustrated), and an optical fiber fanout cable 62 extends from the strain relief section 58.

Adapter body 10 would generally comprise part of or be mounted on a module (not illustrated) which is configured to contain a plurality of optical fibers (not illustrated). The adapter body 10 would be used to attach a connector such as connector 32 to the module. In use, ferrule 54 of connector 32 is inserted into bore 28 and subsequently sleeve 60 of cylindrical housing 18—into the page as viewed in FIG. 1—until the hexagonal body portion 52 and/or tapered portion 56 engage an angled inner wall portion 64 (FIG. 2) of bore 28. The sizes and shapes of bore 28 and connector 32 are selected to mate in a manner that places connector 32 in a desired location when fully inserted into bore 18, and other connector and bore shapes can be used. When connector 32 is inserted in bore 18 with tapered portion 56 of connector 32 in contact with angled inner wall portion 64 of bore 28, wall 59 of connector 32 is located slightly inward of opposed slots 30 in sidewall 22 relative to the front of the bore at end wall 26.

Connector 32 is retained in bore 28 by retainer 34. With connector 32 inserted in bore 28 as described, retainer 34 is snapped onto cylindrical housing 38 by pressing first and second flexible arms 38 of retainer 34 against an upper portion of sidewall 22. This forces the arms 38 away from each other as they slide over curved outer surface 24 and allows the retainer body portion 36 to approach sidewall 22 and tabs 44 to enter opposed slots 30. As the free ends 42 of the flexible arms 38 pass the midpoint of housing 18, the resiliency of the retainer 34 causes the free ends 42 begin to move back toward each other until the concave portions 40 of the arms rest against the curved outer surface 24 of sidewall 22. The retainer 34 is sized so that, in this position, the flexible arms 38 exert a compressive force on sidewall 22 of the housing 18 to hold retainer 34 securely in place. As seen in FIG. 2, tabs 44 extend into bore 28 and partially overlie wall 59 of connector 32. In this manner, the tabs 40 reduce the cross-section of bore 28 in the vicinity of the opposed slots 30 and block connector 32 from being removed from the bore 28. Retainer 34 is removed from housing 18 by pulling on retainer body portion 36 and reversing the above-described actions.

Figure 3:
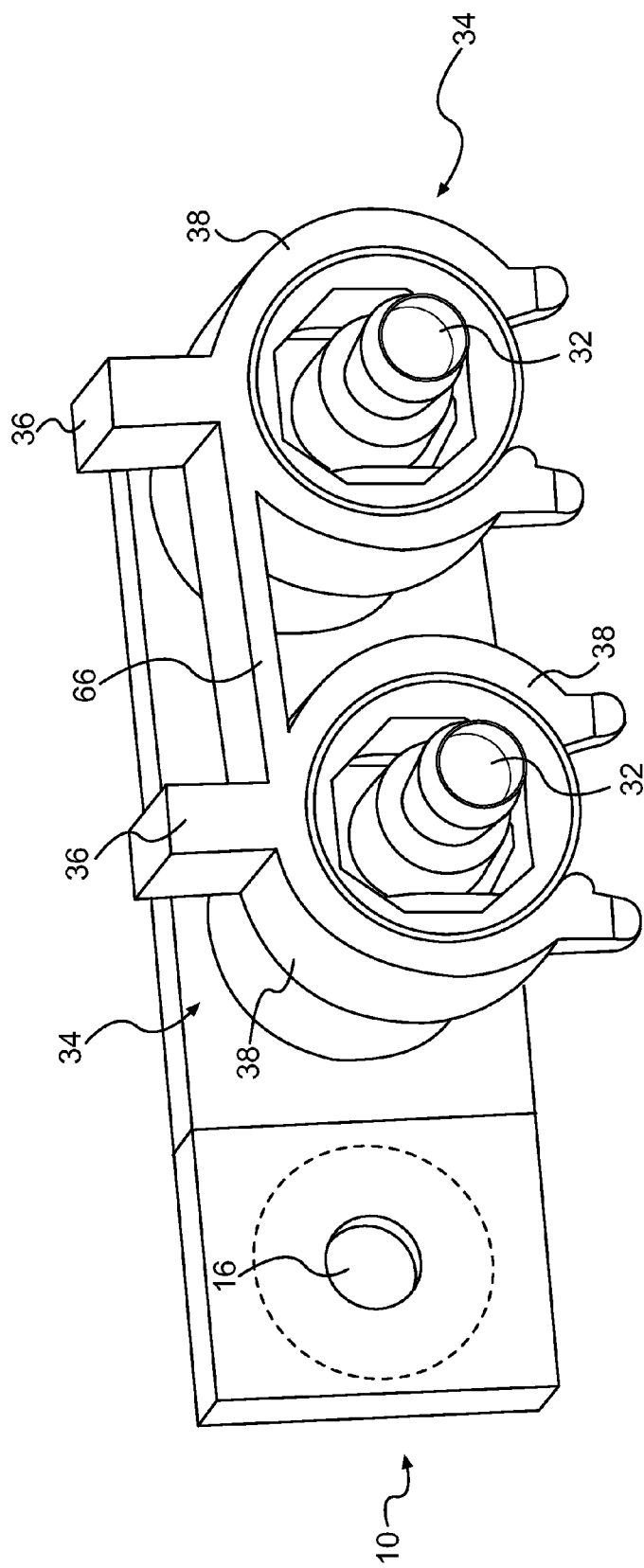
FIG. 3 is a perspective view of a modified version of the optical fiber adapter of FIG. 1 in which a bridge connects the first and second retainers.

FIG. 3 illustrates a modified version of the retainer 34 of FIG. 1. While FIG. 1 illustrates a plurality of retainers 34 each securing a single connector 32 to adapter body 10, in FIG. 3, the individual retainers 34 are connected by a bridge 66 so that multiple retainers can be attached to and removed from adapter body 10 as a unit. While only two cylindrical housings 18 are illustrated in FIG. 1, in use twelve or more cylindrical housings might be present on an adapter body, and it may be advantageous to gang together all twelve of the retainers 34 with bridges 66 or subsets thereof (groups of three or four retainers 34 connected by bridges 66) to allow groups of retainers 34 to be removed and attached in a single step.

Figure 4:
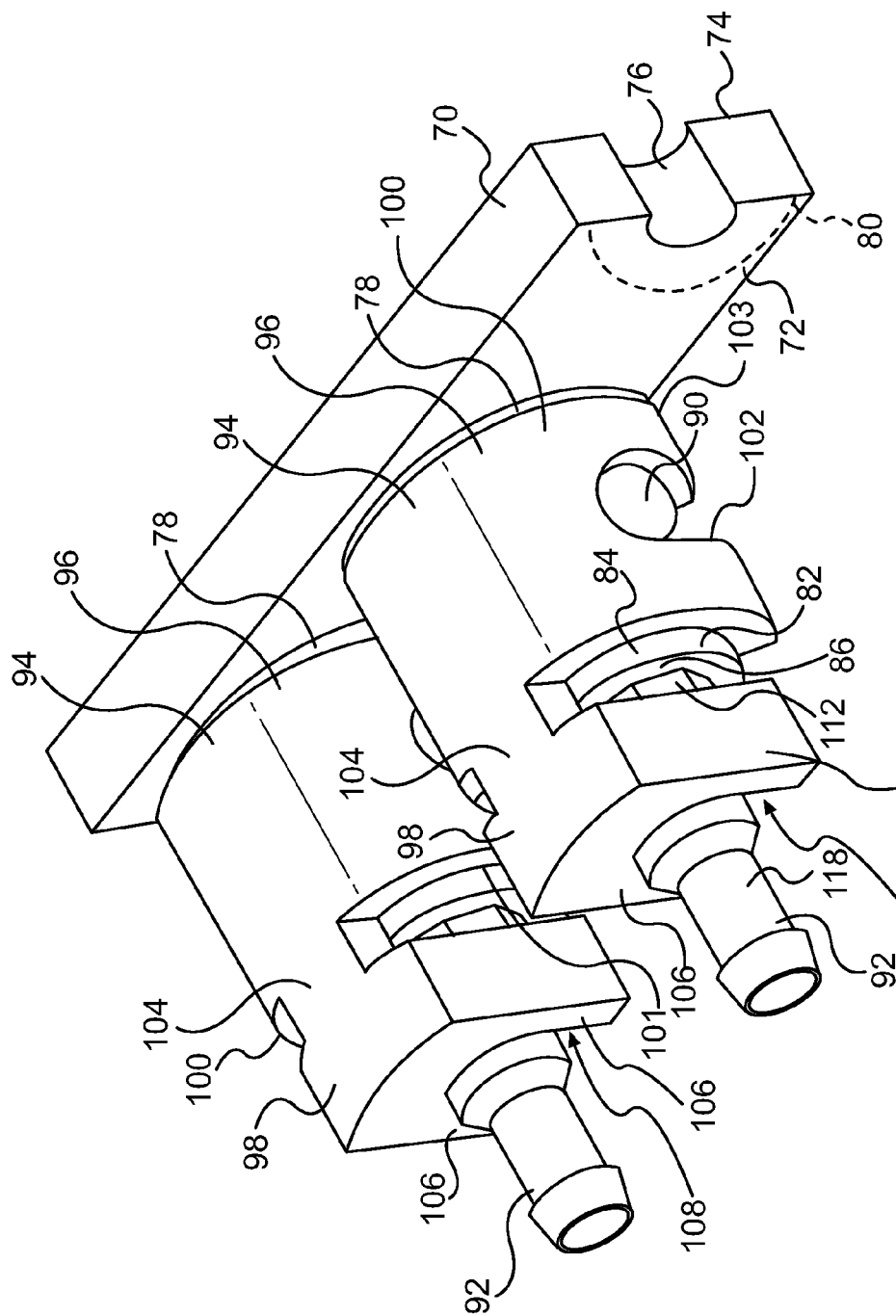
FIG. 4 is a perspective view of an optical fiber adapter according to a second embodiment of the present invention that includes first and second retainers securing first and second optical fiber connectors to an adapter body.

FIG. 4 illustrates a second embodiment of the present invention and includes an adapter body 70 having a first side 72, a second side 74, and a plurality of through-openings 76 (only one of which is illustrated) between the first side 72 and second side 74. Each through-opening 76 is surrounded by a generally cylindrical housing 78, two of which are illustrated in FIG. 4. Dashed line 80 in FIG. 4 shows where a third cylindrical housing 78 has been removed to show the through-opening 76 therebehind. The cylindrical housings 78 may be attached to the adapter body 70 in any conventional manner or may be molded or otherwise formed with the adapter body 70 as a unitary portion thereof. Cylindrical housings 78 each include a sidewall 82 having a curved outer surface 84 and an end wall 86 spaced from the adapter body 70. A bore 88, illustrated in FIG. 5, extends from end wall 86 into the cylindrical housing 78 to one of the through-openings 76, and bore 88 is generally larger than and aligned with the one of the through-opening 76 and configured to receive a connector, such as connector 92 illustrated in FIG. 5. The cylindrical housings 78 also include first and second opposed bosses 90, only one of which is visible in FIG. 4, that project from opposite sides of sidewall 82.

A retainer 94 snaps onto each of the cylindrical housings 78 to secure a connector 92 in the housing 78 as described hereafter. Each of the retainers includes a split-cylindrical body portion 96 configured to engage one of the cylindrical housings 78 to hold the retainers 94 on the cylindrical housing 78 and a fork portion 98 configured to block the withdrawal of the connector 92 from the bore 88. Body portion 96 comprises first and second arcuate, flexible arms 100 having concave inner portions 101, and each arm 100 includes a circumferentially extending groove 102 extending into each arm from an arm free end 103. Fork portion 98 is connected to body portion 96 by a tongue 104 and comprises first and second fingers 106 defining a gap 108 therebetween. Fork portion 98 is spaced from body portion 96 by a distance equal to the length of tongue 104.

Figure 5:
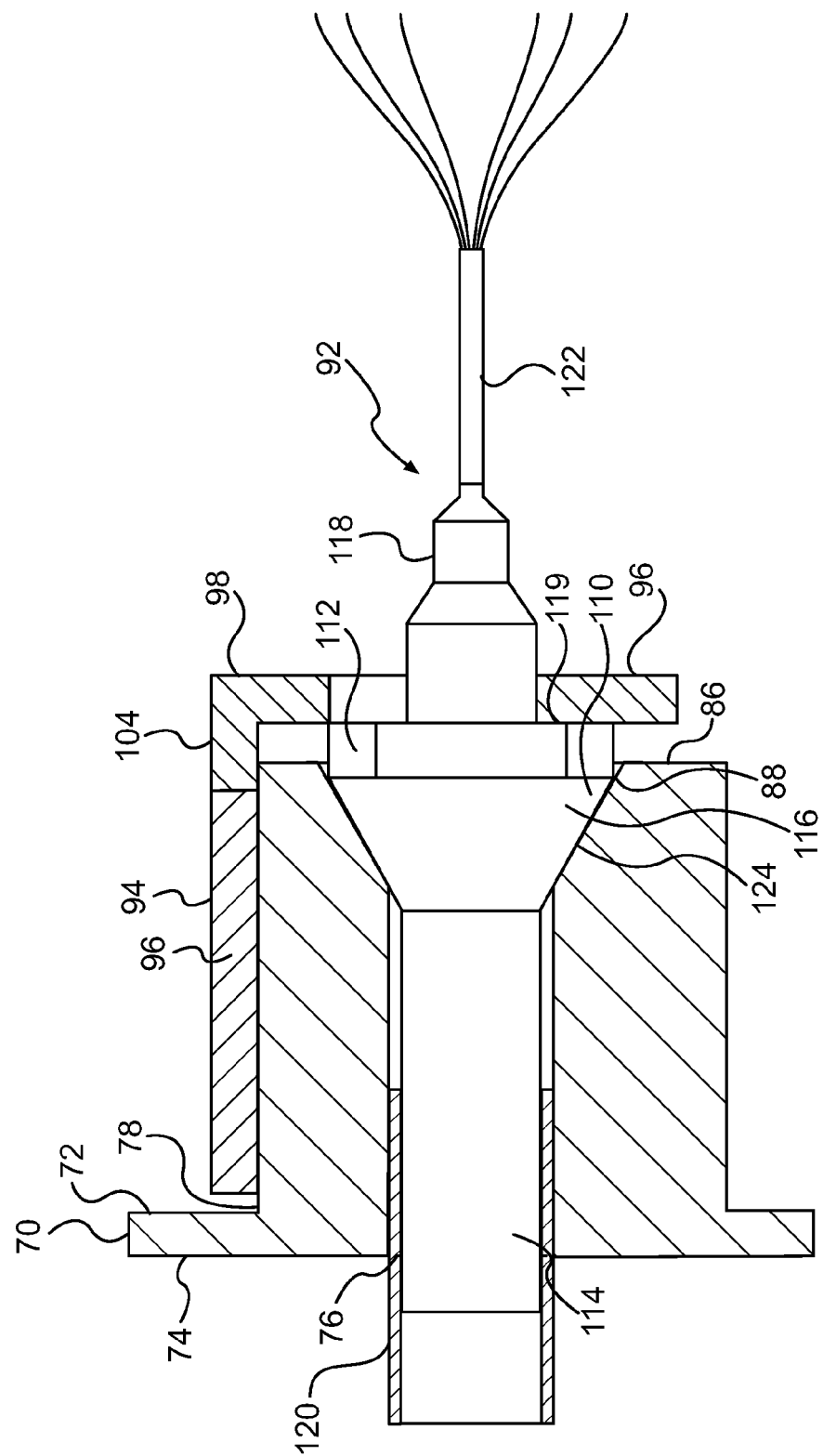
FIG. 5 is side elevational view, partly in section, of a connector secured in one of the housings of FIG. 4 by one of the retainers of FIG. 4.

A connector 92 configured to be received and retained in cylindrical housing 78 is illustrated in FIG. 5. Connector 92 includes a ferrule barrel 110 with a hexagonal body portion 112, a ferrule 114, a tapered portion 116 between the hexagonal body portion 112 and the ferrule 114. Connector 92 also includes a strain relief section 118 on the side of hexagonal body portion 112 opposite from ferrule 114, and a wall 119 between hexagonal body portion 112 and strain relief section 118. A sleeve 120 aligns ferrule 114 with an opposing mated ferrule (not illustrated), and an optical fiber fanout cable 122 extends from the strain relief section 118.

In use, ferrule 114 of connector 92 is inserted in bore 88 of cylindrical housing 78—from left to right as viewed in FIG. 4, until the tapered portion 116 of connector 92 engages angled inner wall 124 of bore 88. In this embodiment, the tapered body portion 116 of the connector 92 and the angled inner wall 124 of bore 88 are configured to leave at least a portion of hexagonal body portion 112 of connector 92 outside bore 88 when the connector 92 is fully inserted in bore 88. However, if tongue 104 were made shorter or eliminated, fork portion 98 would be closer to end wall 86 and could secure connector 92 in a position with wall 119 of connector 92 close to end wall 86 of cylindrical housing 78.

Connector 92 is retained in bore 88 by retainer 94. With connector 92 inserted in bore 88 as described, retainer 94 is pressed against the top of cylindrical housing 78 causing free ends 103 of first and second flexible arms 100 of retainer 94 to slide over curved outer surface 84 of cylindrical housing 78 and move away from one another. As retainer 94 is pressed further onto housing 78, bosses 90 on housing 78 enter grooves 102 in the flexible arms 100. The retainer 94 is sized so that, in this position, the flexible arms 100 cannot return to their original configuration and thus they exert a compressive force on sidewall 82 of the housing 78 to hold retainer 94 in place in this position. As body portion 96 of retainer 94 snaps over cylindrical housing 88, the strain relief portion 118 of connector 94 enters gap 108 between the fingers 106 of fork 98. Tongue 104 is sized so that fork portion 98 will be spaced from end wall 86 of cylindrical housing by a distance approximately equal to the amount of connector hexagonal body portion 112 that remains outside housing 78 when connector 94 is fully inserted in the housing 78. When body portion 96 of retainer is in position on housing 78, fork portion 98 engages wall 119 of connector 94 and blocks the removal of connector 94 from bore 88. The presence of bosses 90 in grooves 102 of retainer 94 substantially prevents retainer 94 from moving axially or circumferentially relative to cylindrical housing 78.

Figure 6:
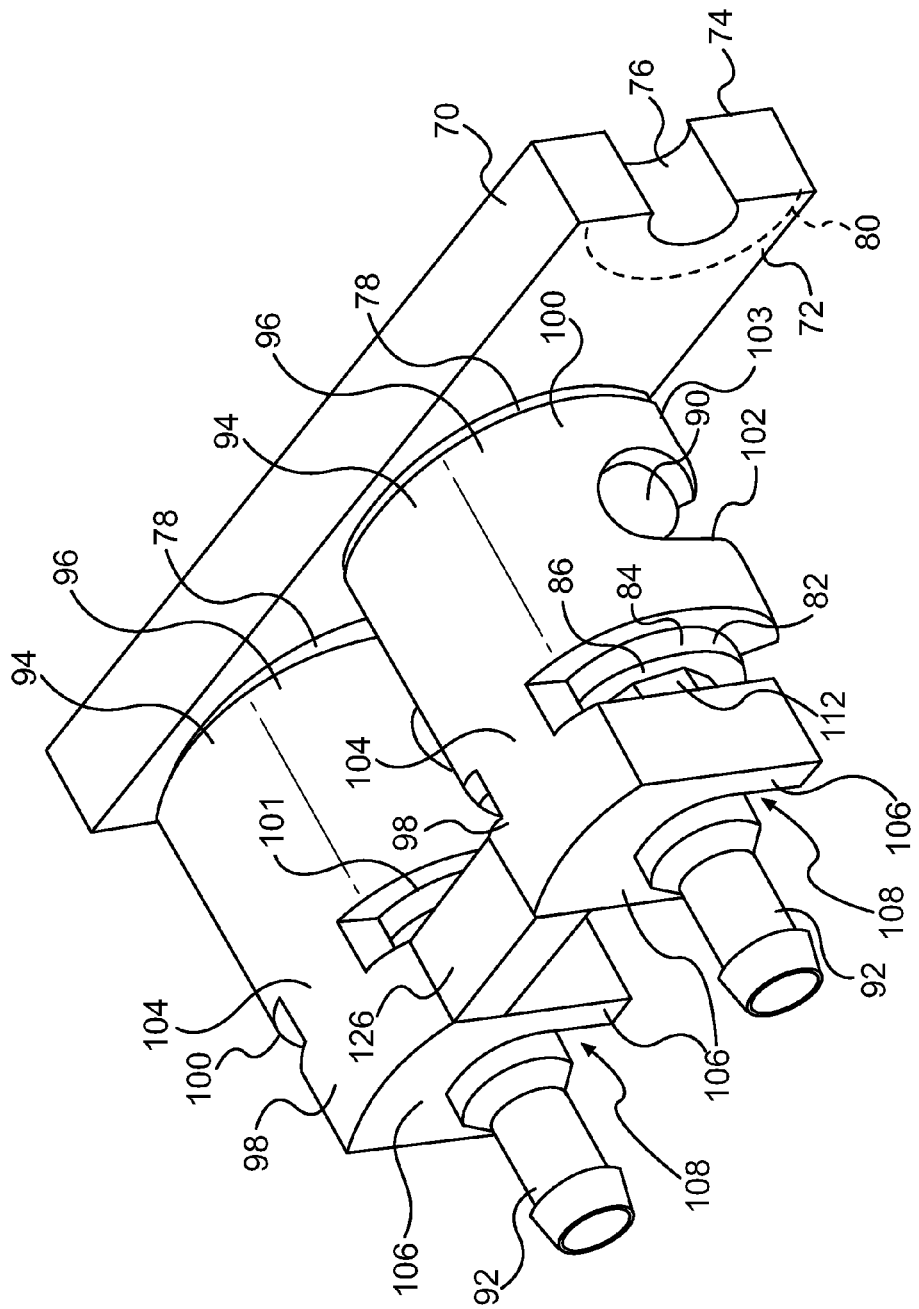
FIG. 6 is a perspective view of a modified version of the optical fiber adapter of FIG. 4 in which a bridge connects the first and second retainers.

FIG. 6 illustrates a modified version of the retainer 94 of FIG. 4. While FIG. 4 illustrates a plurality of retainers 94 each securing a single connector 92 in adapter body 70, in FIG. 6, the individual retainers 94 are connected by a bridge 126 so that multiple retainers can be attached to and removed from adapter body 70 as a unit. While only two cylindrical housings 78 are illustrated in FIG. 4, in use twelve or more cylindrical housings might be present on an adapter body, and it may be advantageous to gang together all twelve of the retainers 94 with bridges 126 or subsets thereof to allow groups of retainers 94 to be removed and attached in a single step.

Figure 7:
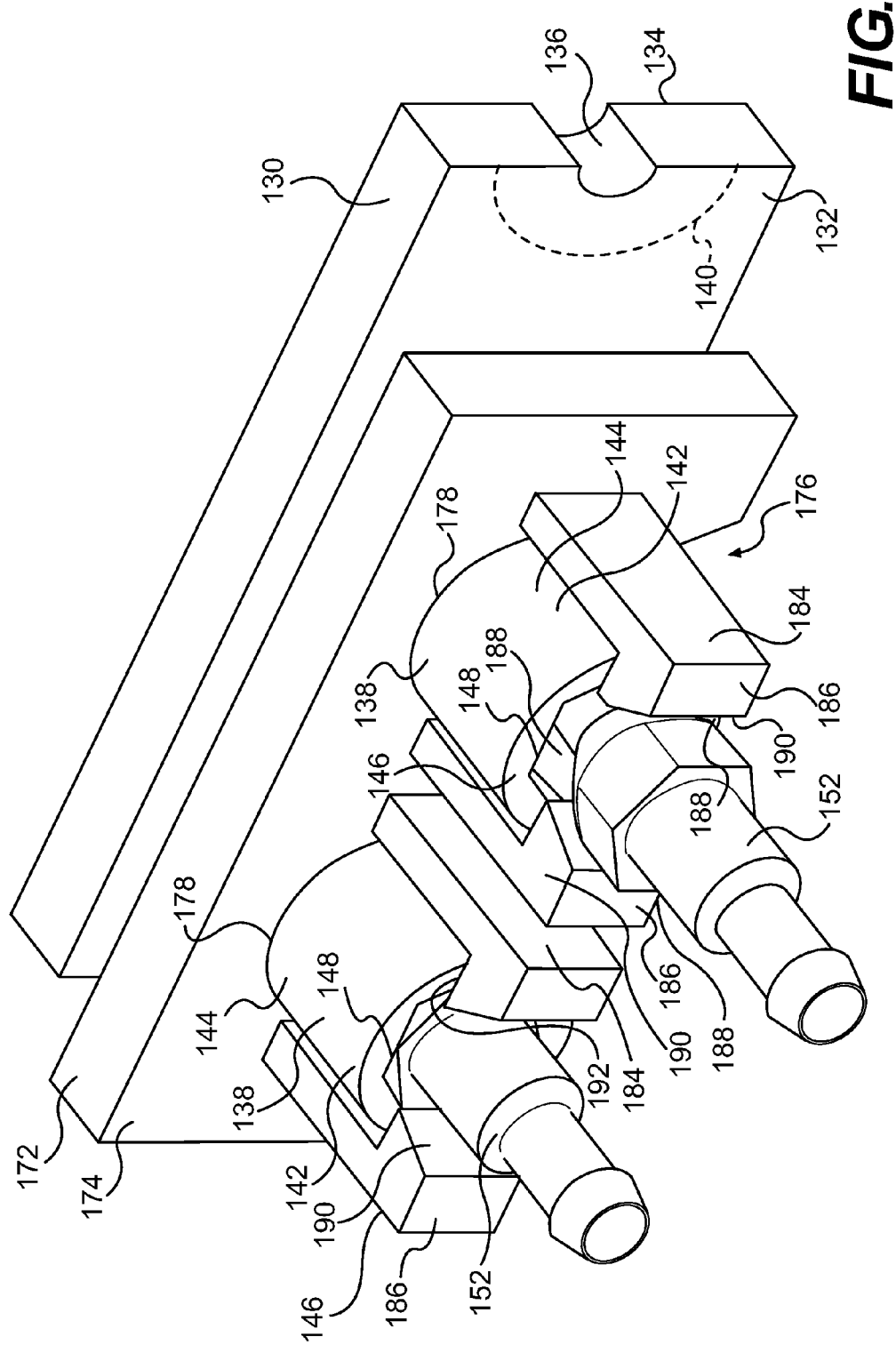
FIG. 7 is a perspective view of an optical fiber adapter according to a third embodiment of the present invention.
Figure 8:
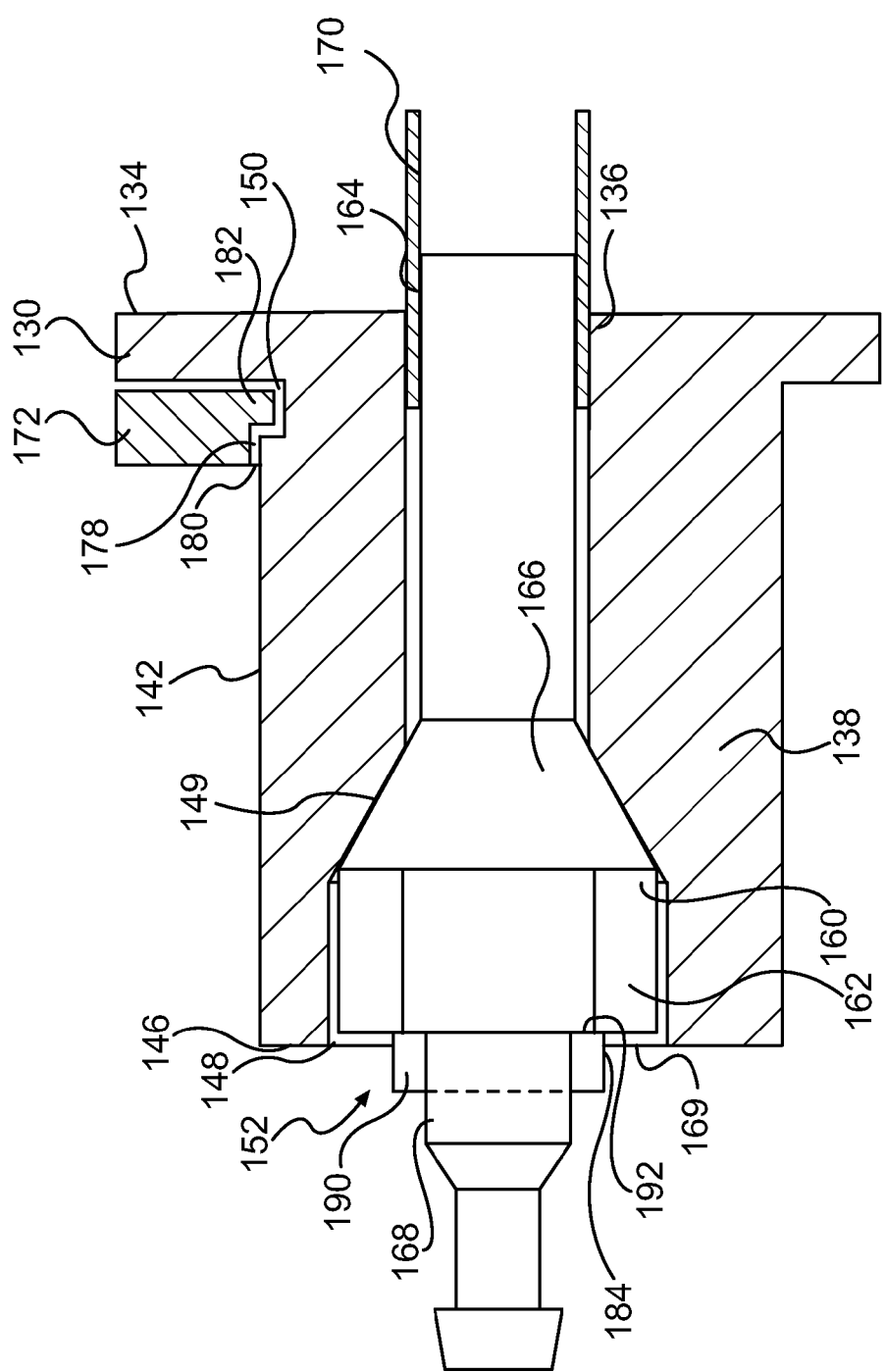
FIG. 8 is a sectional side elevational view taken along line VII-VII in FIG. 6.

FIG. 7 illustrates an adapter according to an additional embodiment of the present invention and includes an adapter body 130 having a first side 132, a second side 134, and a plurality of through-openings 136 (only one of which is illustrated) between the first side 132 and second side 134. Each through-opening 136 is surrounded by a generally cylindrical housing 138, two of which are illustrated in FIG. 7. Dashed line 140 in FIG. 7 shows where a third cylindrical housing 138 has been removed to show the through-opening 136 therebehind. The cylindrical housings 138 may be attached to the adapter body 130 in any conventional manner or may be molded or otherwise formed with the adapter body 130 as a unitary portion thereof. Cylindrical housings 138 each include a wall 142 having a curved outer surface 144 and an end wall 146 spaced from the adapter body 130. A bore 148 extends from end wall 146 into the cylindrical housing 148 to one of the through-openings 146, and bore 148 is generally larger than and aligned with the one of the through-opening 136 and configured to receive a connector, such as connector 152. The cylindrical housings 138 also include a circumferential groove 150, illustrated in FIG. 8, adjacent to adapter body 130.

A connector 152 is configured to be received and retained in cylindrical housing 138. Connector 152 includes a ferrule barrel 160 with a hexagonal body portion 162, a ferrule 164, a tapered portion 166 between the hexagonal body portion 162 and the ferrule 164. Connector 152 also includes a strain relief section 168 on the side of hexagonal body portion 162 opposite from ferrule 164, and a wall 169 between hexagonal body portion 162 and strain relief section 168. A sleeve 170 aligns ferrule 164 with an opposing mated ferrule (not illustrated).

A retainer 172 snaps onto each of the cylindrical housings 138 to secure a connector 152 in the housing 138 as described hereafter. Retainer 172 includes a body portion 174 having one U-shaped opening 176 for each cylindrical housing 138 to which it will connect. Retainer 172, illustrated in FIG. 7, is configured to connect to two cylindrical housings 138 and includes two U-shaped openings 176; however, a retainer 172 may be configured to work with a single cylindrical housing 138 or more than two cylindrical housings 138 depending on the configuration of the adapter body with which it is used. Each U-shaped opening 176 has a width at its open end wide enough to allow one of the cylindrical housings 138 to pass therethrough, and the bight 178 of the U-shaped opening 176 includes a cutout 180 along its length forming a flange 182 extending from leg to leg of the U. First and second flexible arms 184 project perpendicularly from body portion 174 on opposite sides of each U-shaped opening 176, and the free ends 186 of the first and second flexible arms 184 each include an inwardly facing protrusion 188 with opposed cam surfaces 190 angled toward each other in the direction of body portion 174 and inner walls 192 facing toward body portion 174.

Retainer 172 is connected to adapter body 130 by placing U-shaped openings 176 over cylindrical housings 138 and moving the bight 178 of each U-shaped opening toward the cylindrical housings 138 until flange 182 of the retainer 182 enters groove 150 of the cylindrical housing 138 and the retainer 172 is supported on the cylindrical housing 138. The bight 178 of the U-shaped opening prevents the retainer 172 from moving beyond its intended position on the cylindrical housing 138 in a radial direction of the cylindrical housing 138 and the presence of flange 182 in groove 180 prevents the retainer 172 from being removed from the cylindrical housing 138 in an axial direction. Alternately, retainer 172 could be glued or otherwise permanently attached to the adapter body 130. When mounted in this manner, inner walls 192 overlie end wall 146 of cylindrical housing 138 and partially block bore 148.

Retainer 172 can be attached to adapter body 130 before or after connectors 152 are inserted into the bores 148. Before the retainer 172 is attached to the retainer body 130, connectors 152 may be inserted into bores 148 until tapered portions 166 of the connectors come into contact with angled inner walls 149 of bores 148. In this position, wall 169 of connector 152 is generally aligned with end wall 146 of cylindrical housing 138. When retainer 152 is attached to the cylindrical housing 138 as described above, the inner walls 192 of flexible arms 184 overlie wall 169 of the retainer 152 and block the withdraw of the connector 152 from the bore 148. If the retainer 172 is attached to the adapter body 130 before the connectors are inserted, the connectors are aligned with the bores 148 and moved toward bores 148 until the tapered portion 166 of the connectors 152 engage the inwardly angled opposed cam surfaces 190 of the first and second flexible arms 184. Because arms 184 are flexible, pressing the tapered portion 166 of the connectors 152 against cam surfaces 190 and further into bores 148 causes the flexible arms 184 to move away from one another and allow the passage of the connector 152. When wall 169 of the connector passes beyond the inner walls 192 of the flexible arms 184, the resiliency of the flexible arms 184 causes them to snap back to their original position, partially blocking bore 148 to block the removal of connector 152 therefrom. Connectors 152 can be removed from bores 148 either by removing retainer 172 from cylindrical housings 138 or by forcing the flexible arms 184 away from one another so that inner walls 192 do not block bore 148.

The present invention has been described herein in terms of several preferred embodiments. However, additions and modifications to these embodiments may become apparent to those of ordinary skill in the art upon a reading of the foregoing description. It is intended that all such additions and modifications form a part of the present invention to the extent they fall within the scope of the several claims appended hereto.

What is claimed is:

1. A fiber optic adapter configured to retain at least one optical fiber connector comprising:
    a body portion having a first side, a second side, and at least one through-opening between the first side and the second side;
    a first housing projecting from the body portion first side, the first housing including a first bore for receiving the at least one optical fiber connector and having an outer surface, the housing being proximate said at least one through-opening; and
    a retainer comprising a split sleeve having an interior surface mountable on the first housing outer surface and including first and second wall portions having a shape corresponding to a shape of the housing outer surface for engaging and covering opposite sides of the outer surface of said first housing to attach said retainer to said first housing, said retainer including at least one projection configured to block the removal of the at least one optical fiber connector from the first bore when the wall portions engage the opposite sides of the outer surface of the first housing.

2. The fiber optic adapter of claim 1, wherein said at least one projection partially blocks said first bore when said first and second wall portions engage opposite sides of said first housing.

3. The fiber optic adapter of claim 1, wherein the at least one optical fiber connector includes a first optical fiber connector, the fiber optic adapter further comprising:
    the first optical fiber connector retained in said first bore by said at least one projection.

4. The fiber optic adapter of claim 1, including means for preventing said retainer from moving away from said body portion when said first and second wall portions engage opposite sides of said first housing.

5. The fiber optic adapter of claim 1, wherein said first housing includes at least one slot and wherein said at least one projection extends from said first or second wall portion into said at least one slot when said first and second arms wall portions engage opposite sides of said first housing.

6. The fiber optic adapter of claim 1, wherein said first housing includes at least one slot and wherein said at least one projection extends from said first or second wall portion through said at least one slot and into said first bore when said first and second wall portions engage opposite sides of said first housing.

7. The fiber optic adapter of claim 6, wherein said at least one slot comprises first and second slots and wherein said at least one projection comprises a first projection on said first wall portion and a second projection on said second wall portion.

8. The fiber optic adapter of claim 1, wherein said first housing has a circular cross-section and wherein said first and second wall portions cylindrical sections and conform to the outer surface of said first housing.

9. The fiber optic adapter of claim 3, wherein the at least one optical fiber connector further includes a second optical fiber connector, and said at least one through-opening includes first and second through-openings, the fiber optic adapter further comprising:
   a second housing projecting from the body portion first side, the second housing including a second bore for receiving the second optical fiber connector and having an outer surface, the second housing being proximate said second through-opening;
   said retainer including third and fourth wall portions configured to engage opposite sides of said second housing to attach said retainer to said second housing, said third wall portion including at least one projection configured to block the removal of the second optical fiber connector from the second bore of the second housing when the third and fourth wall portions engage the opposite sides of the second housing;
   a bridge connecting said second wall portion to said third wall portion; and
   the second optical fiber connector being retained in said second bore by said at least one projection of said third wall portion.

10. The fiber optic adapter of claim 1, wherein said first housing includes an end wall and wherein said at least one projection overlies said end wall when said first and second wall portions engage opposite sides of said first housing.

11. The fiber optic adapter of claim 1, wherein said first housing includes at least one boss on said at least one first sidewall and said retainer includes at least one slot configured to receive said at least one boss when said first and second wall portions engage opposite sides of said first housing.

12. The fiber optic adapter of claim 11, wherein said first housing includes an end wall and wherein said at least one projection extends beyond said end wall when said first and second wall portions engage opposite sides of said first housing and a fork depending from said at least one projection, said fork overlying and being spaced from said end wall.

13. A fiber optic adapter configured to retain at least one optical fiber connector comprising:
   a body portion having a first side, a second side, and a through-opening between the first side and the second side;
   housing means projecting from the body portion first side for receiving the at least one optical fiber connector, the housing means having at least one sidewall proximate said through-opening; and
   retainer means for engaging opposite sides of said housing means to attach said retainer means to said housing means, said retainer means including projecting means for blocking the removal of the at least one optical fiber connector from the housing means when the retainer means engages the opposite sides of the housing means.

14. A fiber optic adapter configured to retain at least one optical fiber connector comprising:
   a body portion having a first side, a second side, and a first through-opening between the first side and the second side;
   a first housing projecting from the body portion first side at least partially around the first through-opening, said first housing including a first bore in communication with the first through-opening, said first bore for receiving a first optical fiber connector of the at least one optical fiber connector, and said first housing having at least one first sidewall and first and second slots extending through said at least one first sidewall and to said first bore, said first bore having a centerline and a cross-section perpendicular to the centerline between said first and second slots, said cross-section having an area; and
   a first retainer mounted on the first housing, the first retainer including a first pair of flexible arms configured to engage opposite sides of said first housing to attach said first retainer to said first housing, each arm of said first pair of flexible arms including a tab extending through said first and second slots of said first housing and into said first bore, said tabs of said first pair of flexible arms protruding into the area of said cross-section.

15. The fiber optic adapter of claim 14, wherein said first housing includes first and second spaced, arcuate portions and wherein said first pair of flexible arms comprises a first pair of flexible arms curved to engage said first and second spaced, arcuate portions.

16. The fiber optic adapter of claim 15, wherein each arm of said first pair of flexible arms includes a free end and wherein a distance from the free end of one arm of said first pair of flexible arms to the free end of the other arm of said first pair of flexible arms is less than a distance from said first arcuate portion to said second arcuate portion.

17. The fiber optic adapter of claim 14 wherein said body portion includes a second through-opening between the first side and the second side, the fiber optic adapter further comprising:
   a second housing projecting from said body portion first side at least partially around the second through-opening, the second housing including a second bore in communication with the second of through-opening for receiving a second optical fiber connector of the at least one optical fiber connector, and the second housing having at least one second sidewall and third and fourth slots extending through said at least one second sidewall and to said second bore, and
   a second retainer mounted on the second housing, the second retainer including a second pair of flexible arms configured to engage opposite sides of said second housing to attach said second retainer to said second housing.

18. The fiber optic adapter of claim 17, wherein each arm of said second pair of flexible arms includes a tab extending through said third and fourth slots of said second housing and into said second bore of said second housing.

19. The fiber optic adapter of claim 17, wherein said second retainer is connected to said first retainer.

20. The fiber optic adapter of claim 1, wherein said first and second wall portions of said split sleeve extend around more than 180 degrees of the outer surface of said housing.

* * * * *

UNITED STATES PATENT AND TRADEMARK OFFICE
CERTIFICATE OF CORRECTION

PATENT NO. : 8,290,332 B2  Page 1 of 1
APPLICATION NO. : 12/849858
DATED : October 16, 2012
INVENTOR(S) : Ronald Mudd It is certified that error appears in the above-identified patent and that said Letters Patent is hereby corrected as shown below:

Column 8, Claim 5, line 4, delete "arms".

Signed and Sealed this
Eighth Day of January, 2013

David J. Kappos
*Director of the United States Patent and Trademark Office*

UNITED STATES PATENT AND TRADEMARK OFFICE
CERTIFICATE OF CORRECTION

PATENT NO. : 8,290,332 B2  
APPLICATION NO. : 12/849858  
DATED : October 16, 2012  
INVENTOR(S) : Ronald Mudd Page 1 of 1

It is certified that error appears in the above-identified patent and that said Letters Patent is hereby corrected as shown below:

Column 8, line 66 (Claim 5, line 4) delete "arms".

This certificate supersedes the Certificate of Correction issued January 8, 2013.

Signed and Sealed this
Nineteenth Day of February, 2013

Teresa Stanek Rea
*Acting Director of the United States Patent and Trademark Office*